(12) United States Patent
Liu et al.

(10) Patent No.: US 11,376,735 B2
(45) Date of Patent: Jul. 5, 2022

(54) METHOD FOR RAPIDLY DETERMINING WAREHOUSING MAP, DEVICE, STORAGE MEDIUM AND ROBOT

(71) Applicant: SYRIUS ROBOTICS CO., LTD., Shenzhen (CN)

(72) Inventors: Junbin Liu, Shenzhen (CN); Zhiqin Yang, Shenzhen (CN)

(73) Assignee: SYRIUS ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 17/603,931

(22) PCT Filed: Mar. 5, 2020

(86) PCT No.: PCT/CN2020/078041
§ 371 (c)(1),
(2) Date: Oct. 14, 2021

(87) PCT Pub. No.: WO2020/211564
PCT Pub. Date: Oct. 22, 2020

(65) Prior Publication Data
US 2022/0088782 A1    Mar. 24, 2022

(30) Foreign Application Priority Data

Apr. 14, 2019 (CN) .......................... 201910296683.2

(51) Int. Cl.
*B25J 9/16* (2006.01)
*B65G 1/137* (2006.01)

(52) U.S. Cl.
CPC .......... *B25J 9/1664* (2013.01); *B25J 9/1684* (2013.01); *B25J 9/1694* (2013.01); *B65G 1/1378* (2013.01)

(58) Field of Classification Search
CPC ...... B25J 9/1664; B25J 9/1684; B25J 9/1694; B65G 1/1378; G06Q 10/08; G06Q 50/28
See application file for complete search history.

(56) References Cited

U.S. PATENT DOCUMENTS

| | | | |
|---|---|---|---|
| 11,015,938 B2* | 5/2021 | Narendra | G01S 11/08 |
| 2017/0029213 A1* | 2/2017 | Johnson | G05D 1/0011 |
| 2017/0278047 A1* | 9/2017 | Welty | G05D 1/0011 |
| 2018/0059635 A1* | 3/2018 | Johnson | B65G 1/1373 |

(Continued)

FOREIGN PATENT DOCUMENTS

| | | |
|---|---|---|
| CN | 104062973 A | 9/2014 |
| CN | 106959691 A | 7/2017 |

(Continued)

*Primary Examiner* — Robert T Nguyen
(74) *Attorney, Agent, or Firm* — Yu Gang (57) ABSTRACT

Provided are a method for rapidly determining a warehousing map, a device, a storage medium and a robot. The method includes: generating a warehouse map of a warehouse; acquiring a motion position and pose of the robot, and acquiring information of a mark on a rack collected by an image collection sensor on the robot; determining a mark position of the mark; determining a rack position of the rack and a depositary place position of each depositary place on the rack; and determining a warehousing map of the warehouse. The method can rapidly create the warehousing map in the warehouse, and position accuracy of the depositary place in the warehousing map is high.

20 Claims, 9 Drawing Sheets

(56) References Cited

U.S. PATENT DOCUMENTS

| | | | |
|---|---|---|---|
| 2018/0088586 A1* | 3/2018 | Hance | G06Q 50/28 |
| 2018/0201444 A1* | 7/2018 | Welty | B65G 1/1373 |
| 2019/0138978 A1* | 5/2019 | Johnson | G06Q 10/087 |
| 2020/0239231 A1* | 7/2020 | Johnson | G06Q 10/00 |
| 2020/0239233 A1* | 7/2020 | Johnson | G06Q 10/08355 |
| 2020/0246972 A1* | 8/2020 | Johnson | B25J 9/1666 |
| 2020/0246978 A1* | 8/2020 | Johnson | B25J 13/06 |

FOREIGN PATENT DOCUMENTS

| | | |
|---|---|---|
| CN | 107144852 A | 9/2017 |
| CN | 108363386 A | 8/2018 |
| CN | 110039543 A | 7/2019 |
| CN | 110189068 A | 8/2019 |

\* cited by examiner

METHOD FOR RAPIDLY DETERMINING WAREHOUSING MAP, DEVICE, STORAGE MEDIUM AND ROBOT

CROSS REFERENCE

This application is a National Stage Filing of the PCT International Application No. PCT/CN2020/078041 filed on Mar. 5, 2020, which claims priority to Chinese Application No. 201910296683.2 filed on Apr. 14, 2019, the entirety of which is herein incorporated by reference.

TECHNICAL FIELD

The disclosure relates to the field of intelligent devices, in particular to a method for rapidly determining a warehousing map, a device, a storage medium and a robot.

BACKGROUND

Against a background of rapid development of e-commerce and fast growth in order quantities, in order to improve picking efficiency and meet demands for ever-increasing order quantities, various logistics device manufacturers have introduced different kinds of devices based on the basically same principle. Specifically, goods are put in material boxes, pushed to picking stations by robots, and then picked by pickers according to prompts on system interfaces.

Thus, positioning depositary places in warehouses is crucial to any device above. A current solution is to draw robot maps in the warehouses, then mark the depositary places on racks manually and map the depositary places to the robot maps, such that robots can find the depositary places according to the robot maps. Since there are tens of thousands of depositary places in the warehouses generally, traditionally mapping each depositary place to the robot maps is time-consuming, manpower-consuming and resource-consuming, thereby influencing deployment speeds of the robots.

SUMMARY

Technical Problems

In order to solve the above technical problems or at least partially solve the above technical problems, the embodiments of the disclosure provide a method for rapidly determining a warehousing map, a device, a storage medium and a robot.

Solution to the Problems

In a first aspect, the embodiments of the disclosure provide a method for rapidly determining a warehousing map. The method includes:
generating, according to induction data collected when a robot moves in a warehouse, a warehouse map of the warehouse;
acquiring a motion position and pose of the robot in real time, and acquiring information of a mark on a rack collected by an image collection sensor on the robot, wherein at least one rack is arranged in the warehouse, each rack is provided with at least one group of marks, and an outer outline surface of the rack is provided with at least one mark;
determining a mark position of the mark in the warehouse map based on the motion position and pose and the information of the mark;
determining a rack position of the rack and a depositary place position of each depositary place on the rack in the warehouse map according to preset depositary place information of the rack and the mark position; and
determining a warehousing map of the warehouse according to the warehouse map, the rack position and the depositary place position.

In a second aspect, the embodiments of the disclosure provide an electronic device. The device includes: a memory, a processor, and a computer program which is stored on the memory and is runnable on the processor, where when executing the program, the processor implements the method for rapidly determining the warehousing map of any embodiment in the first aspect.

In a third aspect, the embodiments of the disclosure provide a computer readable storage medium storing one or more programs, where the one or more programs are able to be executed by one or more processors, so as to implement the method for rapidly determining the warehousing map of any embodiment in the first aspect.

In a fourth aspect, the embodiments of the disclosure provide a robot. The robot includes:
an inductive sensor configured to collect induction data in a warehouse;
an image collection sensor configured to collect information of a mark on a rack of the warehouse;
a position and pose sensor configured to collect a motion position and pose of the robot; and
a processor configured to determine a mark position of the mark in a warehouse map based on the motion position and pose and the information of the mark; determine a depositary place position of each depositary place on the rack in the warehouse map according to preset depositary place information of the rack and the mark position; and create a corresponding relation between a preset depositary place mark of each depositary place on the rack and a corresponding depositary place position of the depositary place.

Beneficial Effects

According to the method for rapidly determining the warehousing map, the device, the storage medium and the robot provided by the embodiments of the disclosure, for a warehouse with racks, the warehouse map can be determined according to induction data collected in the warehouse by the robot when moving in the warehouse, the information of the mark arranged on the rack is collected by using the image collection sensor on the robot, then, the rack position of the rack and the depositary place position of each depositary place on the rack are determined according to the information of the mark, and finally the warehouse warehousing map of the warehouse is automatically generated. According to the method, the warehousing map is created with the assistance of the information of the mark arranged on the rack, so as to greatly accelerate creation of the warehousing map for the warehouse. In addition, the warehousing map is not created manually, thereby reducing errors caused by manual calibration. Therefore, the warehousing map in the warehouse can be created rapidly, and position accuracy of the depositary place in the warehousing map is high.

BRIEF DESCRIPTION OF THE DRAWINGS

Accompanying drawings described herein are incorporated in the specification and constitute a portion of the specification, and embodiments consistent with the present disclosure are described and used to explain principles of the present disclosure together with the specification.

To describe the technical solutions in the embodiments of the disclosure or in the prior art more clearly, the following briefly describes the accompanying drawings required in descriptions of the embodiments or in the prior art. Apparently, a person having ordinary skill in the art can still derive other accompanying drawings from these accompanying drawings without creative efforts.

DETAILED DESCRIPTION OF THE EMBODIMENTS

To make the objectives, technical solutions, and advantages of the embodiments of the disclosure clearer, the following will clearly and integrally describes the technical solutions in the embodiments of the disclosure with reference to the accompanying drawings in the embodiments of the disclosure. Apparently, the described embodiments are some rather than all of the embodiments of the disclosure. All other embodiments derived by a person having ordinary skill in the art based on the embodiments of the disclosure without creative efforts shall fall within the protection scope of the disclosure.

The method provided in the embodiments of the disclosure may be used in any warehouse with racks, which may be a warehouse with existing racks or a warehouse rapidly laid out.

Figure 1:
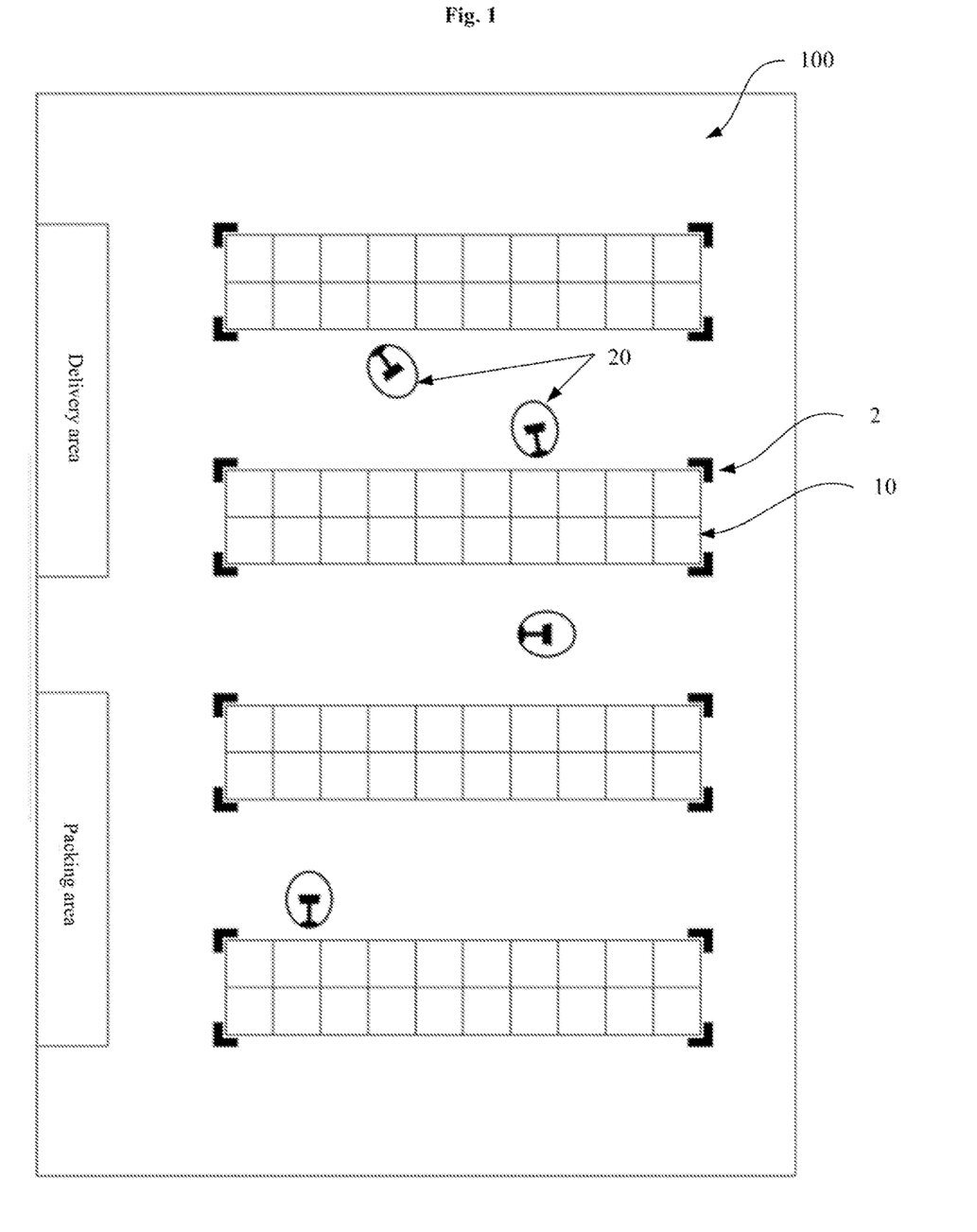
FIG. 1 is a schematic diagram of a rapidly laid-out warehouse provided by the embodiments of the disclosure.

The following description takes the warehouse rapidly laid out as an example. FIG. 1 is a schematic diagram of a warehouse rapidly laid out provided by the embodiments of the disclosure, and FIG. 1 is a top view of the warehouse. As shown in FIG. 1, the warehouse 100 may include a rack 10, a packing area and a delivery area, at least one robot 20 is arranged in the warehouse, and the robot may move through an aisle between the racks 10 to put goods in or take goods out of the racks to the packing area. In some embodiments, there may be at least one rack 10 and at least one robot 20. During actual use, the number of racks 10 and the number of robots may be configured according to actual needs, which is not limited in the disclosure.

Figure 2:
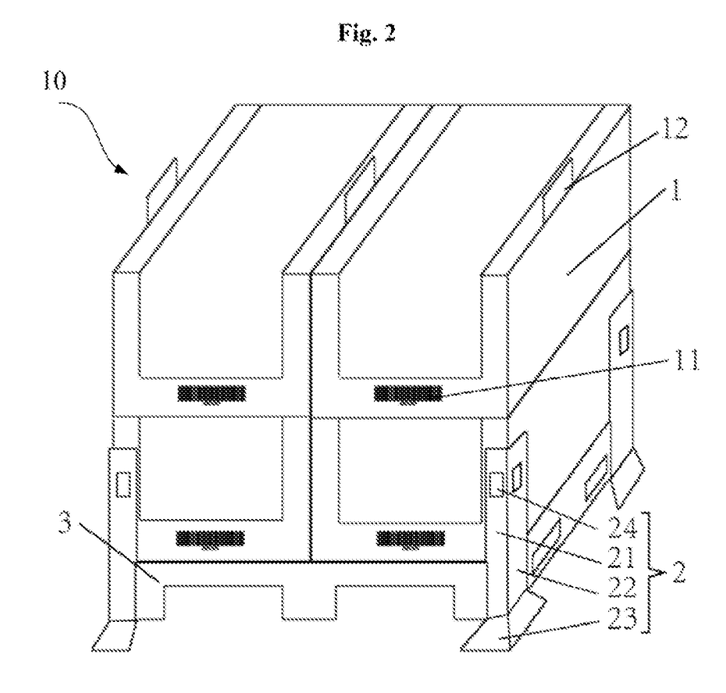
FIG. 2 is a structural schematic diagram of a rack provided by the embodiments of the disclosure.

As shown in FIG. 1 and FIG. 2, the rack 10 includes storage boxes 1 and four corner posts 2, where adjacent storage boxes 1 are detachably connected through a detachable connection structure, and each storage box 1 constitutes a depositary place for containing objects. As shown in FIG. 1, the detachable connection structure in the figure includes a bolt 12 and a slot corresponding to each other, where the bolt 12 is arranged at a top of the storage box 1, and the slot is provided at a bottom of the storage box 1. In use, the plurality of storage boxes 1 may be vertically stacked, and two storage boxes 1 may be stably connected through mutual cooperation of the bolt 12 and the slot. In addition, the detachable connection structure provided by some embodiments is simple in structure, and can realize quick disassembly and assembly, and improve working efficiency.

In the embodiments of the disclosure, at least one group of marks are further arranged on each rack, and at least one mark is arranged on an outer outline surface of the rack. In the embodiments of the disclosure, the mark is used for recognizing the outer outline surface of the rack, and a position of the outer outline surface of the rack can be detected by detecting a position of the mark. In an embodiment, the position of the outer profile surface may be a projection line, on the ground, of the outer outline surface in view of the fact that the outer profile surface is a vertical surface perpendicular to the ground.

Moreover, arranging the group of marks on the rack means that marks between different racks are different, but the marks of the same rack are related, so as to determine, by determining a group of marks, a rack with the group of marks.

In addition, in the embodiments of the disclosure, in order to facilitate rapid recognition of the rack, as some exemplary implementations, two marks are arranged at a joint of two adjacent outer outline surfaces on the rack, such that a position of a corner of the rack can be determined by these two marks. In the embodiments of the disclosure, the mark may be fixed on the rack, for example, on an outer surface of the storage box 1, as shown in FIG. 1. In the embodiments of the disclosure, as shown in FIG. 1 and FIG. 2, in order to increase stability of the storage box 1, the corner posts 2 are arranged at four corners of the rack correspondingly. In some embodiments, the corner post 2 includes a first plate 21, a second plate 22, a base 23 and a support portion. An application document of a rack filed on the same day as that of the present disclosure may be referred to for a detailed description of the corner post 2, which is not repeated herein. As shown in FIG. 1, the corner post 2 is further provided with marks 24, and the first plate 21 and the second plate 22 of the corner post each are provided with one mark 24 for recognizing two outer outline surfaces, where the corner post is located, of the rack.

As shown in FIG. 2, the rack 10 may further include a support frame 3, the support frame 3 is arranged below the storage box, and several corner posts 2 encircle the support frame 3. The support frame 3 can support a bottom surface of the storage box, and can share pressure borne by the corner post 2, thus stabilizing the rack better. In addition, the support frame 3 can isolate the storage box from the ground, thus preventing moisture.

Figure 3:
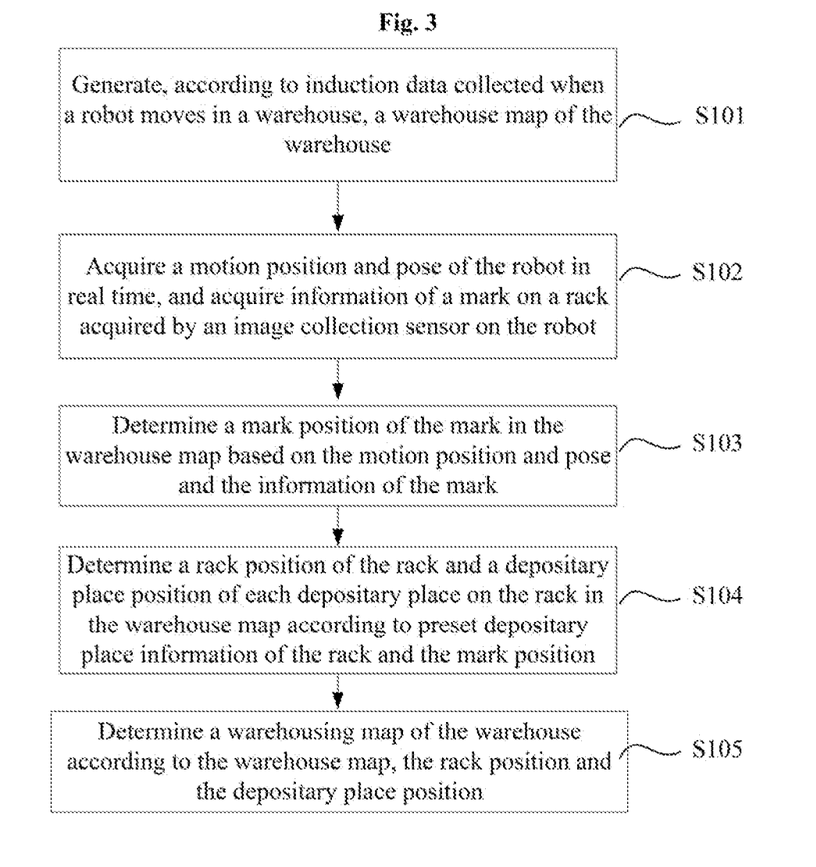
FIG. 3 is a schematic flowchart of a method for rapidly determining a warehousing map provided by the embodiments of the disclosure.

FIG. 3 is a schematic flowchart of a method for rapidly determining a warehousing map provided by the embodiments of the disclosure. As shown in FIG. 3, in the embodiments of the disclosure, the method includes operations S101 to S105.

In S101, a warehouse map of a warehouse is generated according to induction data collected when a robot moves in the warehouse.

After the rack 10 is detachably mounted in the warehouse according to a manner as shown in FIG. 1 and FIG. 2, the robot for transporting goods in the warehouse may be controlled to move in the warehouse, and when the robot moves, a sensor arranged on the robot may be used to collect information in the warehouse, such that the warehouse map may be restored based on the information.

In order to restore the warehouse map, a position, a shape and a size of an object (including a rack or an obstacle, etc.) in the warehouse need to be known, so the induction data refer to data used to detect the object in the warehouse. In the embodiments of the disclosure, the induction data may be acquired through radar detection. The warehouse map, as a sketch map, provides simple information such as a position where an object is located and a position where an aisle is located.

In S102, a motion position and pose of the robot are acquired in real time, and information of a mark on a rack collected by an image collection sensor on the robot is acquired.

The robot is further provided with the image collection sensor. When moving in the warehouse, the image collection sensor collects information on an image at the same time, detailed information on the object in the warehouse is processed based on the information on the image, for example, the rack may be recognized or the depositary place on the rack may be recognized.

In the embodiments of the disclosure, the motion position and pose includes a motion position and a pose of the image collection sensor at the motion position, where the motion position is used for positioning the robot, and the pose is used for determining an angle and an orientation of the image collection sensor, when collecting the information on the image, on the robot.

In the embodiments of the disclosure, the mark arranged on the rack is used for positioning the mark, and the mark may be a graphic code following a preset arrangement rule, such as a two-dimensional code and Apriltag. The mark may alternatively be an image, such as an image including a plurality of points. The mark code may alternatively be a character, such as a number or a letter. In some exemplary implementations of the embodiments of the disclosure, the mark is a graphic code, and the graphic code is a two-dimensional code.

In the operation, the acquired motion position and pose corresponds to the acquired information of the mark, that is, the motion position and pose and the information of the mark are acquired at the same time. For example, when the robot is in position A, a motion position and pose at position A is acquired, and information of a mark, collected at position A, on the rack is acquired. When the robot moves to position B, a motion position and pose of position B is acquired and information of a mark, collected at position B, on the rack is acquired, such that the motion position acquired at position A corresponds to the information of the mark acquired at position A and the motion position acquired at position B corresponds to the information of the mark acquired at position B.

In S103, a mark position of the mark is determined in the warehouse map based on the motion position and pose and the information of the mark.

A robot position in the warehouse can be determined based on the motion position in the motion position and pose, while a relative position of the mark relative to the robot can be determined based on the pose in the motion position and pose and the information of the mark, and the mark position of the mark can be further determined based on the robot position and the relative position.

In S104, a rack position of the rack and a depositary place position of each depositary place on the rack are determined in the warehouse map according to preset depositary place information of the rack and the mark position.

Since the mark is located on the outer outline surface of the rack, a rack area of an outer outline of the rack can be determined based on the mark position, but information about an interior of the rack is still unavailable. In the embodiments of the disclosure, the preset depositary place information refers to a size of each storage box, the number of storage boxes, and the number of layers of the storage boxes in the rack.

Figure 4:
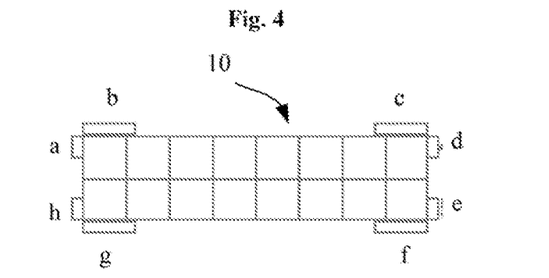
FIG. 4 is a structural schematic diagram of the rack and marks provided by the embodiments of the disclosure.
Figure 5:
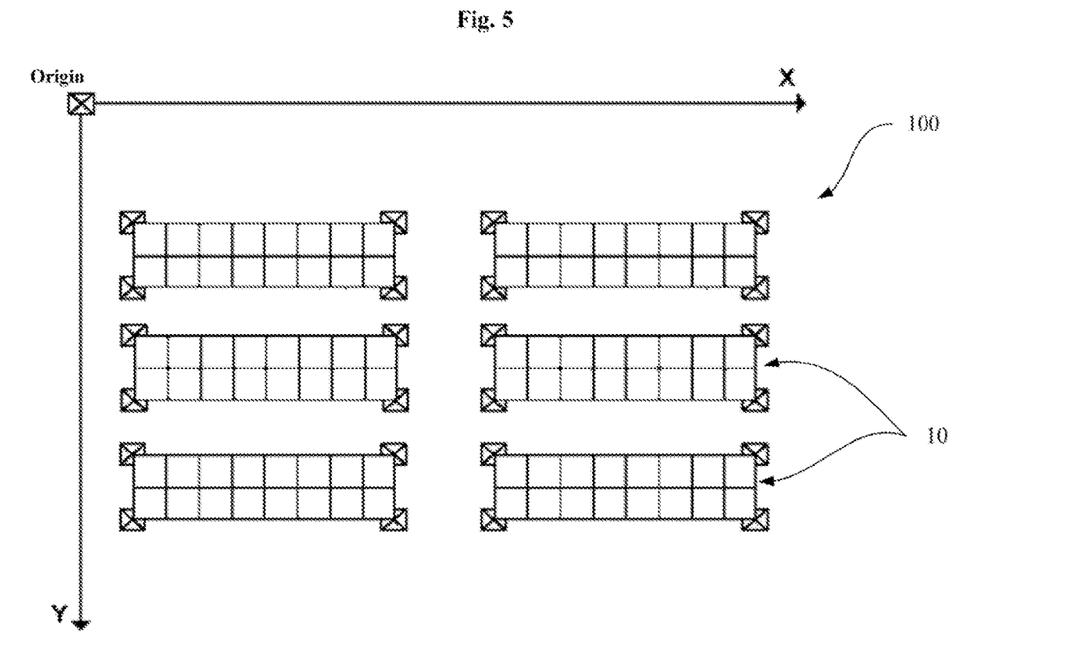
FIG. 5 is a structural schematic diagram of coordinates in a warehouse provided by the embodiments of the disclosure.

As shown in FIG. 4, according to positions of mark a, mark b, mark c, mark d, mark e, mark f, mark g and mark h, specific coordinates of the eight marks on the ground of the warehouse can be acquired, and in addition, linear distances between the four corresponding corners of the rack can be calculated. For example, a distance between (a, b) and (c, d) is 4 m and a distance between (a, b) and (g, h) is 1.6 m. In the current embodiment, the preset depositary place information of the rack includes the size of each storage box in the rack, for example, a width of the storage box is 0.5 m and a length of the storage box is 0.8 m. As shown in FIG. 5, if the ground of the warehouse is regarded as a two-dimensional coordinate system, it may be automatically calculated that the rack has eight storage boxes in a direction of an X axis and there are two storage boxes in a direction of a Y axis. According to structures of different layers on the rack in combination with information on heights of the layers, three-dimensional coordinates of each storage box, that is, the depositary place position, can be acquired.

Therefore, according to the information of the mark and the preset depositary place information, a solid structure and details of the rack can be restored, such that depositary place positions of the depositary places in the rack can be determined.

In S105, a warehousing map of the warehouse is determined according to the warehouse map, the rack position and the depositary place position.

In this operation, the rack position and the depositary place position are marked in the warehouse map, so as to acquire the warehousing map of the warehouse. Since there are the rack position and the depositary place position in the warehousing map, the warehousing map may be used as a robot map. When goods are put into storage, it is only needed to establish a corresponding relation between the goods and the depositary place, such that the goods can be automatically positioned directly based on the warehousing map when the robot picks goods later.

The method may be executed by a robot processor in the robot shown in FIG. 1, or by a corresponding warehouse server or warehouse processor in the warehouse, which is not limited by the disclosure. When the method is executed by the warehouse server or the warehouse processor, the robot needs to collect data and transmit the collected data to the warehouse server or the warehouse processor.

According to the method provided by the embodiments of the disclosure, for a warehouse with racks, the warehouse map can be determined according to induction data collected in the warehouse by the robot when moving in the warehouse, the information of the mark arranged on the rack is collected by using the image collection sensor on the robot, then, the rack position of the rack and the depositary place position of each depositary place on the rack are determined according to the information of the mark, and finally the warehouse warehousing map of the warehouse is automatically generated.

According to the method, the warehousing map is created with the assistance of the information of the mark arranged on the rack, so as to greatly accelerate creation of the warehousing map for the warehouse. In addition, the warehousing map is not created manually, thereby reducing errors caused by manual calibration. Therefore, the method can rapidly create the warehousing map in the warehouse, and position accuracy of the depositary place in the warehousing map is high.

In the embodiments of the disclosure, after operation S105 in FIG. 3, the method may include operation S106.

In S106, a corresponding relation between a preset depositary place mark of each depositary place on the rack and a corresponding depositary place position of the depositary place is created.

The preset depositary place mark is used to identify the depositary place on the rack. As shown in FIG. 2, there is also a preset depositary place mark 11 on each storage box 1 in the figure. The preset depositary place mark 11 corresponds to the storage box 1 one by one, that is, each storage box has a unique depositary place mark 11.

In the embodiments of the disclosure, the preset depositary place mark may be a two-dimensional code, a bar code, or a character string, such as a letter string or a number string. A purpose of the preset depositary place mark in whatever form is to find the depositary place. Therefore, in the embodiments of the disclosure, after the depositary place position is determined, it is needed to create the corresponding relation between the preset depositary place mark and the depositary place position, such that the depositary place can be rapidly searched through the corresponding relation.

Figure 6:
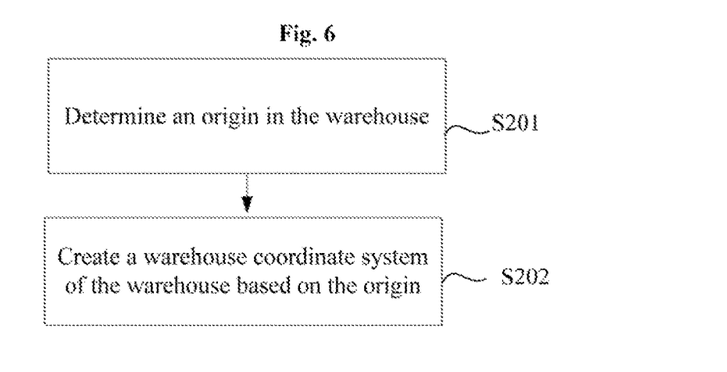
FIG. 6 is another schematic flowchart of a method for rapidly determining a warehousing map provided by the embodiments of the disclosure.

In the embodiments of the disclosure, before S101 shown in FIG. 3, as shown in FIG. 6, the method may further include operations S201 and S202.

In S201, an origin in the warehouse is determined.

In the embodiments of the disclosure, the origin may be any point in the warehouse, and may be randomly selected by a technician in a practical application. However, in order to facilitate subsequent positioning of the rack and the depositary place in the warehouse, a point in a corner of the warehouse is usually selected as the origin. As shown in FIG. 5, a point in an area of an upper left corner in the figure is selected as the origin.

When the origin is determined, an initial position where the robot is located may be taken as the origin, an origin mark may be arranged at the origin position, the origin may be determined by recognizing the origin mark, and the origin mark may be a two-dimensional code, a bar code, etc.

In S202, a warehouse coordinate system of the warehouse is created based on the origin.

After the origin is determined, the warehouse coordinate system corresponding to the ground of the warehouse can be created based on the origin. The warehouse coordinate system may be a two-dimensional horizontal coordinate system, and the warehouse map, the motion position and pose, the mark position, the rack position and the depositary place position described in the operation shown in FIG. 3 above are all in the warehouse coordinate system. As shown in FIG. 5, the warehouse coordinate system can cover the whole warehouse. In the embodiments of the disclosure, the X axis and the Y axis of the warehouse coordinate system may be parallel to external sides of the warehouse.

The created warehouse coordinate system may be a horizontal coordinate system. If a Z axis in a height direction of the warehouse is added to the horizontal coordinate system, a solid coordinate system corresponding to the warehouse can be formed.

Figure 7:
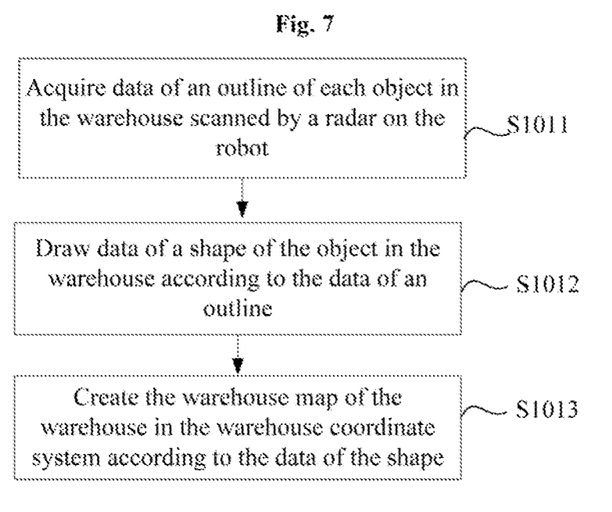
FIG. 7 is a detailed schematic flowchart of S101 in FIG. 3.

In the embodiments of the disclosure, as shown in FIG. 7, S101 shown in FIG. 3 may include operations S1011 to S1013.

In S1011, data of an outline of each object in the warehouse scanned by a radar on the robot are acquired.

In the embodiments of the disclosure, the object in the warehouse is determined by using a reflected signal of a wave of the radar, so the data of the outline refer to an orientation and a distance of the object relative to the radar, that is, an orientation and a distance relative to the robot, which are calculated according to the reflected signal of the wave of the radar.

It is simple and convenient to use radar scanning since there may be various objects, besides the goods racks, in the warehouse, which include goods piles, obstacles, etc. Radar scanning may be used to determine an outline of each object without acquisition of detailed information on the object.

In S1012, data of a shape of the object in the warehouse are drawn according to the data of the outline.

In the embodiments of the disclosure, the data of the shape are used to indicate the outline of each object in the warehouse. In the horizontal coordinate system, the data of the shape may also be expressed as lines on a plane.

In S1013, the warehouse map of the warehouse is created in the warehouse coordinate system according to the data of the shape.

The warehouse map of the warehouse may be acquired by projecting a shape of the object into the warehouse coordinate system according to the data of the shape.

In the embodiments of the disclosure, the mark includes the mark code, and the information of the mark includes the information on the image of the mark code. The positioning of the mark may be implemented by use of triangulation, and accordingly data of the robot at two different positions are required to be acquired. For example, when the robot is at point A, a position and pose of the image collection sensor is the first motion position and pose correspondingly, and information on a first image of the mark code is collected. When the robot is at point B, a position and pose of the image collection sensor is a second motion position and pose correspondingly, and information on a second image of the mark code is collected.

Figure 8:
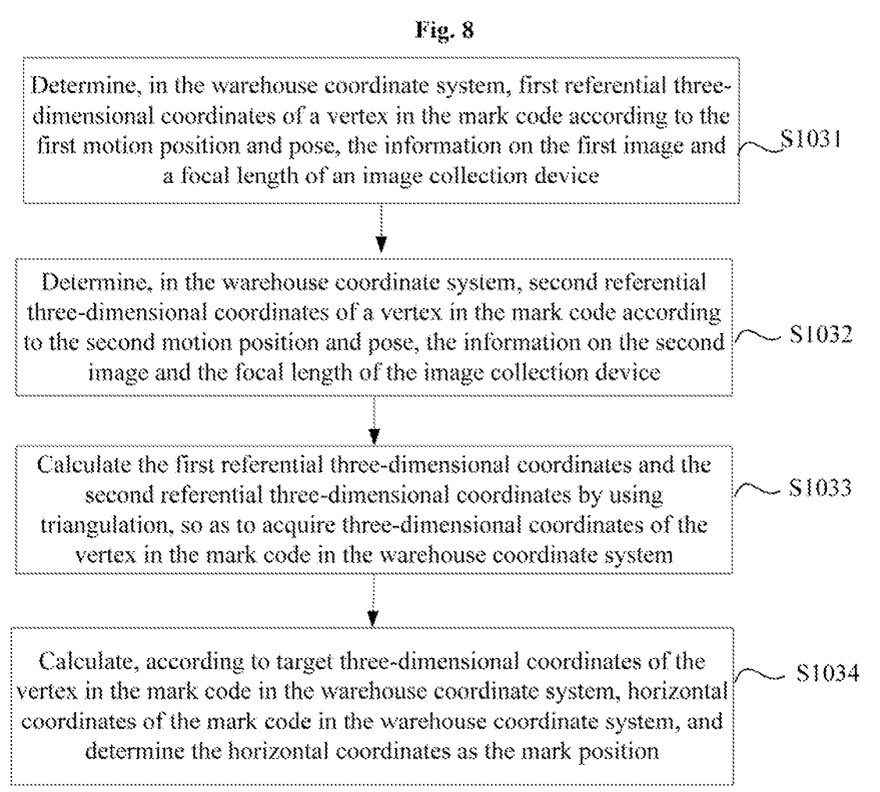
FIG. 8 is a detailed schematic flowchart of S103 in FIG. 3.

Based on the embodiments shown in FIG. 6, as shown in FIG. 8, S103 shown in FIG. 3 may include operations S1031 to S1034.

In S1031, in the warehouse coordinate system, first referential three-dimensional coordinates of a vertex in the mark code are determined according to the first motion position and pose, the information on the first image and a focal length of the image collection sensor.

In the embodiments of the disclosure, with reference to descriptions of S202, the three-dimensional coordinates refer to coordinates in the warehouse coordinate system being a solid coordinate system. The method for calculating three-dimensional coordinates of points based on the position and pose, the information on the image and the focal length in the field of image recognition may refer to related art, which is not repeated herein.

In S1032, in the warehouse coordinate system, second referential three-dimensional coordinates of a vertex in the mark code are determined according to the second motion position and pose, the information on the second image and the focal length of the image collection sensor.

In S1031 and S1032, information of the mark on the same rack may be collected from point A and point B separately, and different three-dimensional referential coordinates may be determined.

In S1033, three-dimensional coordinates of the vertex in the mark code in the warehouse coordinate system are calculated by using the triangulation based on the first referential three-dimensional coordinates and the second referential three-dimensional coordinates.

Based on the triangulation, target three-dimensional coordinates of each vertex in the mark code can be acquired.

In S1034, according to target three-dimensional coordinates of the vertex in the mark code in the warehouse coordinate system, horizontal coordinates of the mark code in the warehouse coordinate system are calculated, and the horizontal coordinates are determined as the mark position.

In the embodiments of the disclosure, the mark includes a mark code, and the information of the mark includes the information on the image of the mark code. The mark is positioned by using depth information of the image collection sensor on the robot.

Figure 9:
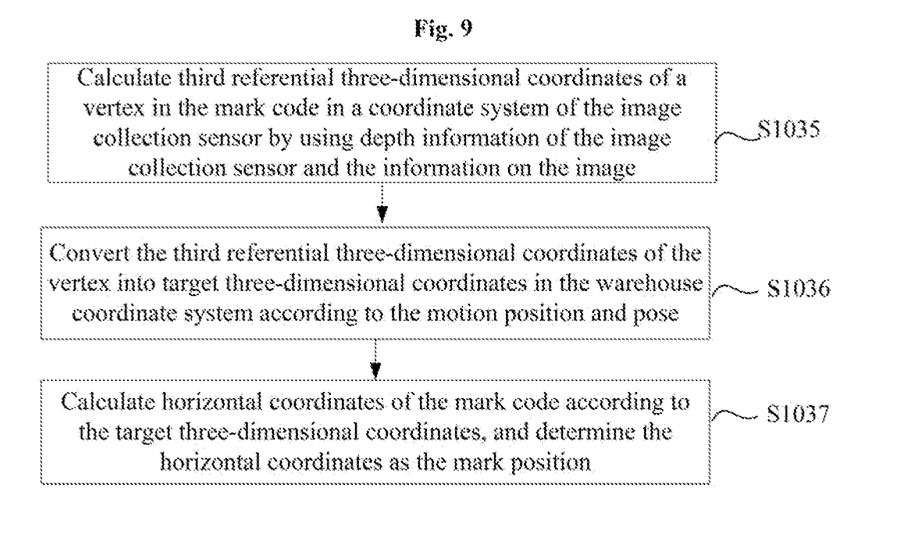
FIG. 9 is another detailed schematic flowchart of S103 in FIG. 3.

As shown in FIG. 9, S103 shown in FIG. 3 may include operations S1035 to S1037.

In S1035, third referential three-dimensional coordinates of the vertex in the mark code are calculated in a coordinate system of the image collection sensor by using the depth information of the image collection sensor and the information on the image.

Based on the information on the image, coordinates (u, v), in the image, of the vertex of the mark code are determined. Supposing that the three-dimensional coordinates of the vertex in the mark code in the coordinate system of the image collection sensor are Pc=(Xc, Yc, Zc), where Zc is the depth information, and corresponding Pc may be calculated by the following method:

$$Xc = Zc * u / f$$
$$Yc = Zc * v / f$$

where f is a focal length of a camera.

In S1036, the third referential three-dimensional coordinates of the vertex are converted into target three-dimensional coordinates in the warehouse coordinate system according to the motion position and pose.

In the embodiments of the disclosure, if a position and pose of the image sensor is T, then the target three-dimensional coordinates are $P_w = T*Pc$, that is, the target position and pose is calculated.

Since the three-dimensional coordinates Pc are in the coordinate system of the image collection sensor, the target three-dimensional coordinates may be acquired by conversion according to the motion position and pose of the image collection sensor.

In S1037, horizontal coordinates of the mark code are calculated according to the target three-dimensional coordinates, and the horizontal coordinates are determined as the mark position.

The horizontal coordinates refer to the coordinates in the horizontal coordinate system composed of the X axis and the Y axis in FIG. 5.

Figure 10:
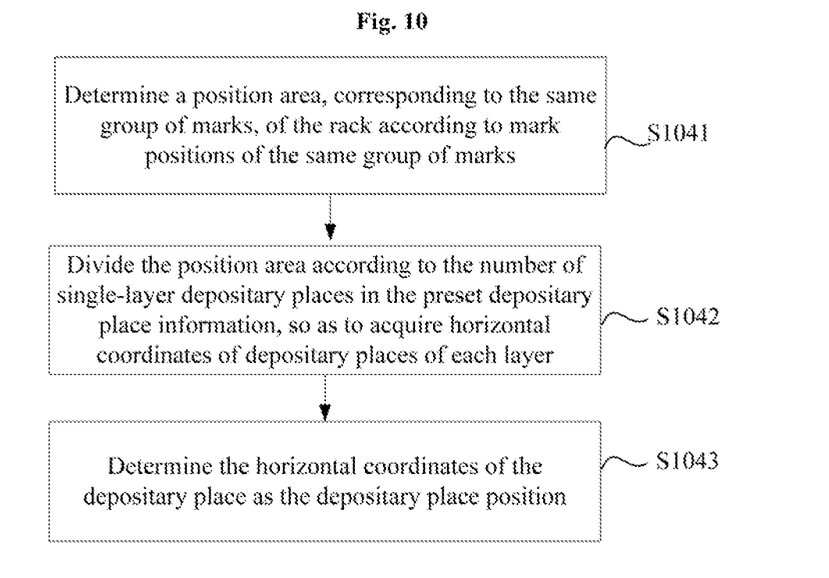
FIG. 10 is a detailed schematic flowchart of S104 in FIG. 3.

As shown in FIG. 10, in the embodiments of the disclosure, S104 may include operations S1041 to S1043.

In S1041, a position area, corresponding to the same group of marks, of the rack is determined according to mark positions of the same group of marks.

With reference to FIG. 5, since the marks on each rack are the same group of marks, the position area of the rack may be determined according to the acquired information of the mark. In FIG. 5, after four corners of the rack are determined, an area defined by the four corners is the position area of the rack.

In S1042, the position area is divided according to the number of single-layer depositary places in the preset depositary place information, so as to acquire horizontal coordinates of depositary places of each layer.

Details of each rack are shown in FIG. 4. As shown in FIG. 4, according to positions of mark a, mark b, mark c, mark d, mark e, mark f, mark g and mark h, specific coordinates of the eight marks on the ground of the warehouse may be acquired, and in addition, linear distances between the four corresponding corners of the rack may be calculated. For example, a distance between (a, b) and (c, d) is 4 m and a distance between (a, b) and (g, h) is 1.6 m. Supposing the preset depositary place information including a width of the storage box being 0.5 m and the length being 0.8 m, it can be automatically calculated that the rack has eight storage boxes in a direction of an X axis and there are two storage boxes in a direction of a Y axis. The horizontal coordinates refer to the coordinates in the horizontal coordinate system composed of the X axis and the Y axis in FIG. 5.

In S1043, the horizontal coordinates of the depositary place are determined as the depositary place position.

In the foregoing embodiment, the mark position, the rack position and the depositary place position may be determined by using the mark arranged on the rack. After the warehousing map is created, the robot can move according to the warehousing map. However, during actual motion of the robot, with motion time lapses, some deviation may be introduced in the positioning process of the robot. Since the mark position is fixed, a robot position may be calibrated by using these marks arranged on the rack during motion of the robot.

Figure 11:
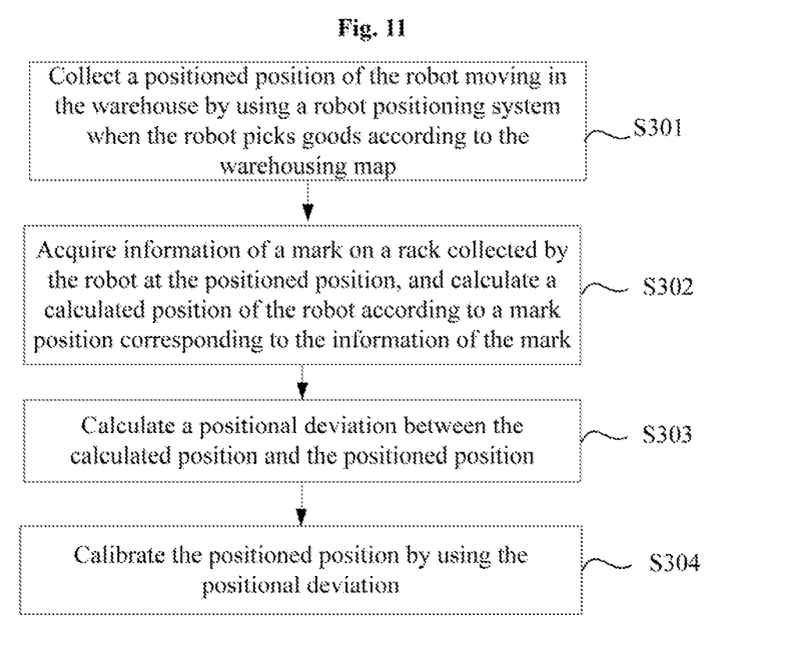
FIG. 11 is another schematic flowchart of the method for rapidly determining the warehousing map provided by the embodiments of the disclosure.

As shown in FIG. 11, the method may include operations S301 to S304.

In S301, a positioned position of the robot moving in the warehouse is collected by using a robot positioning system when the robot picks goods according to the warehousing map.

In the embodiments of the disclosure, the robot may perform positioning calibration at intervals according to an set time interval. In addition, position calibration may also be performed when the robot finds a position error during picking.

During calibration, it is needed to acquire the positioned position collected by the robot using a positioning system of the robot as a basis of calibration.

In S302, information of a mark on a rack collected by the robot at the positioned position is acquired, and a calculated position of the robot is calculated according to a mark position corresponding to the information of the mark.

With reference to the foregoing process of calculating the mark position of the mark according to the robot position, on the contrary, when the mark position of the mark is known, a current calculated position of the robot may be reversely calculated. Herein, a process of calculating the position is not described in detail, with details referred to the foregoing description.

In S303, a positional deviation between the calculated position and the positioned position is calculated.

In S304, the positioned position is calibrated by using the positional deviation.

In the embodiments of the disclosure, calibration may be performed when the deviation occurs. In addition, a tolerance of the position deviation may be set as required, and calibration is performed as long as the position deviation is greater than a preset value.

Figure 12:
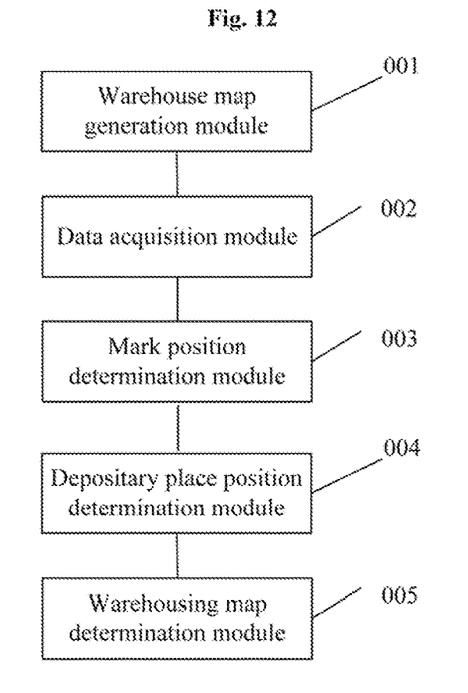
FIG. 12 is a structural schematic diagram of a device for rapidly determining a warehousing map provided by the embodiments of the disclosure.

FIG. 12 is a structural schematic diagram of a device for rapidly determining a warehousing map provided by the embodiments of the disclosure. As shown in FIG. 12, the device includes:

a warehouse map generation module 001 configured to generate, according to induction data collected when a robot moves in a warehouse, a warehouse map of the warehouse;

a data acquisition module 002 configured to acquire a motion position and pose of the robot in real time, and acquire information of a mark on a rack collected by an image collection sensor on the robot, wherein at least one rack is arranged in the warehouse, each rack is provided with at least one group of marks, and an outer outline surface of the rack is provided with at least one mark;

a mark position determination module 003 configured to determine a mark position of the mark in the warehouse map based on the motion position and pose and the information of the mark;

a depositary place position determination module 004 configured to determine a rack position of the rack and a depositary place position of each depositary place on the rack in the warehouse map according to preset depositary place information of the rack and the mark position; and a warehousing map determination module 005 configured to determine a warehousing map of the warehouse according to the warehouse map, the rack position and the depositary place position.

The device for rapidly determining a warehousing map provided in some embodiments can execute all the operations of the foregoing method for rapidly determining a warehousing map, so as to realize technical effects of the foregoing method for rapidly determining a warehousing map. Reference may be made to the foregoing related description of the method for rapidly determining the warehousing map for details, which are not repeated herein for concision.

Figure 13:
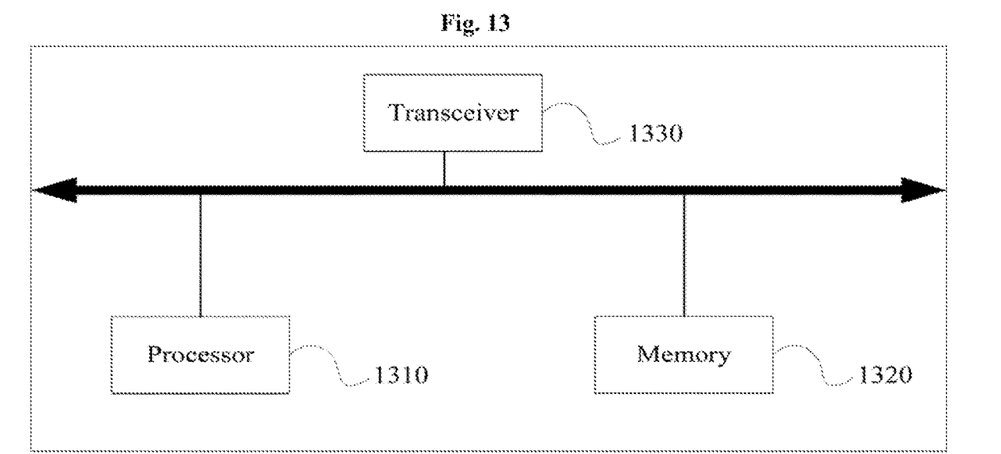
FIG. 13 is a structural schematic diagram of an electronic device provided by the embodiments of the disclosure.

FIG. 13 is a structural schematic diagram of an electronic device provided by the embodiments of the disclosure. As shown in FIG. 13, the electronic device includes:

a processor 1310, a memory 1320 and a transceiver 1330.

The processor 1310 may be a graphics processing unit (GPU), a central processing unit (CPU), or a combination of the CPU and a hardware chip. The above hardware chip may be an application-specific integrated circuit (ASIC), a programmable logic device (PLD) or a combination thereof. The above PLD may be a complex programmable logic device (CPLD), a field-programmable gate array (FPGA), a generic array logic (GAL) or any combination thereof.

The memory 1320 is configured to store various applications, operating systems and data. The memory 1320 may transmit stored data to the processor 1310. The memory 1320 may include a volatile memory, a non-volatile random access memory (NVRAM), a phase change RAM (PRAM), a magnetoresistive random access memory (MRAM), etc., for example, at least one magnetic disk memory device, an electrically erasable programmable read-only memory (EEPROM), a flash memory device, for example, a NOR flash memory or a NAND flash memory, and a semiconductor device, for example a solid state disk (SSD). The memory 1320 may further include a combination of the above memories.

The transceiver 1330 is configured to transmit and/or receive data, and the transceiver 1330 may be an antenna, etc.

Operation processes of the devices are described as follows.

The processor 1310 is configured to generate, according to induction data collected when a robot moves in a warehouse, a warehouse map of the warehouse; acquire a motion position and pose of the robot in real time, and acquire information of a mark on a rack collected by an image collection sensor on the robot; determine a mark position of the mark in the warehouse map based on the motion position and pose and the information of the mark; determine a rack position of the rack and a depositary place position of each depositary place on the rack in the warehouse map according to preset depositary place information of the rack and the mark position; and determine a warehousing map of the warehouse according to the warehouse map, the rack position and the depositary place position.

The electronic device provided in some embodiments can execute all the operations of the foregoing method for rapidly determining a warehousing map, so as to realize technical effects of the foregoing method for rapidly determining a warehousing map. Reference may be made to the foregoing related description of the method for rapidly determining the warehousing map for details, which are not repeated herein for concision.

The embodiments of the disclosure further provide a storage medium (a computer readable storage medium). The storage medium herein stores one or more programs. The storage medium may include a volatile memory, for example a random access memory. The memory may also include a nonvolatile memory, for example a read-only memory, a flash memory, a hard disk or a solid-state disk. The memory may also include a combination of the above kinds of memories.

When one or more programs in the storage medium are executed by one or more processors, the above method for rapidly determining a warehousing map executed on a side of a device for detection a target object based on real-time ground detection can be realized.

The processor is configured to execute a program of the method for rapidly determining the warehousing map stored in the memory, so as to implement the following operations of the method for rapidly determining the warehousing map executed on a side of the device for rapidly determining a warehousing map:

According to induction data collected when a robot moves in a warehouse, a warehouse map of the warehouse is generated; a motion position and pose of the robot are acquired in real time, and information of a mark on a rack collected by an image collection sensor on the robot is acquired, where at least one rack is arranged in the warehouse, each rack is provided with at least one group of marks, and an outer outline surface of the rack is provided with at least one mark; a mark position of the mark in the warehouse map is determined based on the motion position and pose and the information of the mark; a rack position of the rack and a depositary place position of each depositary place on the rack are determined in the warehouse map according to preset depositary place information of the rack and the mark position; and a warehousing map of the warehouse is determined according to the warehouse map, the rack position and the depositary place position.

Figure 14:
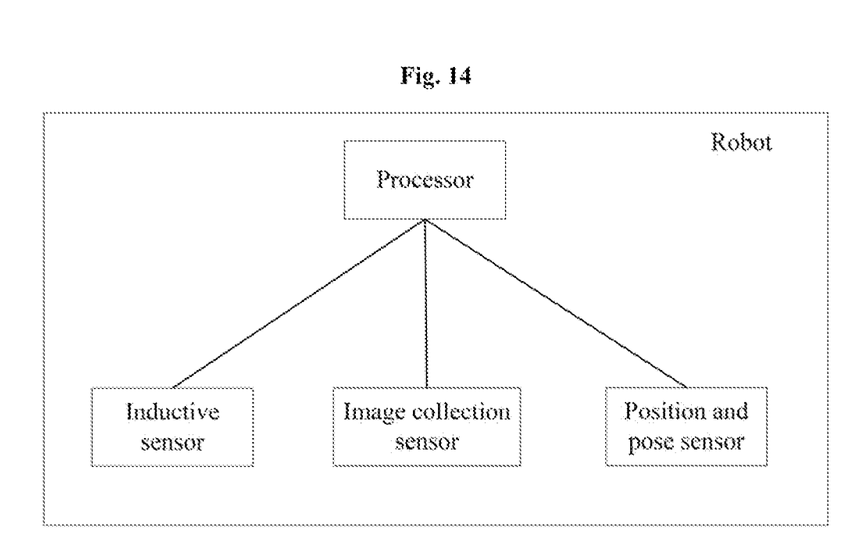
FIG. 14 is a structural schematic diagram of a robot provided by the embodiments of the disclosure.

The embodiments of the disclosure further provide a robot. FIG. 14 is a structural schematic diagram of a robot provided by the embodiments of the disclosure. The robot is used in a warehousing system, and includes:

an inductive sensor configured to collect induction data in a warehouse;

an image collection sensor configured to collect information of a mark on a rack of the warehouse;

a position and pose sensor configured to collect a motion position and pose of the robot; and a processor configured to determine a mark position of the mark in a warehouse map based on the motion position and pose and the information of the mark; determine a depositary place position of each depositary place on the rack in the warehouse map according to preset depositary place information of the rack and the mark position; and create a corresponding relation between a preset depositary place mark of each depositary place on the rack and a corresponding depositary place position of the depositary place.

The robot provided in some embodiments can execute all the operations of the foregoing method for rapidly determining a warehousing map, so as to realize technical effects of the foregoing method for rapidly determining a warehousing map. Reference may be made to the foregoing related description of the method for rapidly determining the warehousing map for details, which are not repeated herein for concision.

In the embodiments of the disclosure, the robot may further include a memory, on which a computer program runnable on a processor is stored.

When executing the program, the processor implements the method for rapidly determining the warehousing map according to any one of the first aspect.

What is described above is merely exemplary embodiments of the present disclosure, such that those having ordinary skill in the art can understand or implement the embodiments of the present disclosure. Many modifications to these embodiments will be apparent to those having ordinary skill in the art, and the general principles defined herein may be implemented in other embodiments without departing from the scope of the present disclosure. Therefore, the present disclosure will not be limited to these embodiments shown herein, but will accord with the widest scope consistent with the principles and novel features applied herein.

INDUSTRIAL APPLICABILITY

According to the method for rapidly determining the warehousing map, the device, the storage medium and the robot provided by the embodiments of the disclosure, for a warehouse with racks, the warehouse map can be determined according to induction data collected in the warehouse by the robot when moving in the warehouse, the information of the mark arranged on the rack is collected by using the image collection sensor on the robot, then, the rack position of the rack and the depositary place position of each depositary place on the rack are determined according to the information of the mark, and finally the warehouse warehousing map of the warehouse is automatically generated. According to the method, the warehousing map is created with the assistance of the information of the mark arranged on the rack, so as to greatly accelerate creation of the warehousing map for the warehouse. In addition, the warehousing map is not created manually, thereby reducing errors caused by manual calibration, and position accuracy of the depositary place in the warehousing map is high.

What is claimed is:

1. A method for determining a warehousing map, comprising:

generating, according to induction data collected when a robot moves in a warehouse, a warehouse map of the warehouse;

acquiring a motion position and pose of the robot in real time, and acquiring information of a mark on a rack collected by an image collection sensor on the robot, wherein at least one rack is arranged in the warehouse, each rack is provided with at least one group of marks, and an outer outline surface of the rack is provided with at least one mark;

determining a mark position of the mark in the warehouse map based on the motion position and pose and the information of the mark;

determining a rack position of the rack and a depositary place position of each depositary place on the rack in the warehouse map according to preset depositary place information of the rack and the mark position; and determining a warehousing map of the warehouse according to the warehouse map, the rack position and the depositary place position.

2. The method according to claim 1, further comprising:

determining an origin in the warehouse; and creating a warehouse coordinate system of the warehouse based on the origin, wherein the warehouse map, the motion position and pose, the mark position, the rack position and the depositary place position are all in the warehouse coordinate system.

3. The method according to claim 2, wherein the generating, according to the induction data collected when the robot moves in the warehouse, the warehouse map of the warehouse comprises:

acquiring data of an outline of each object in the warehouse scanned by a radar on the robot;

drawing data of a shape of the object in the warehouse according to the data of the outline; and creating the warehouse map of the warehouse in the warehouse coordinate system according to the data of the shape.

4. The method according to claim 2, wherein the mark comprises a mark code, the information of the mark comprises information on an image of the mark code, the motion position and pose comprises a first motion position and pose and a second motion position and pose, the information of the mark comprises information on a first image, collected in the first motion position and pose, of the mark code, and information on a second image, collected in the second motion position and pose, of the mark code; and the determining the mark position of the mark in the warehouse map based on the motion position and pose and the information of the mark comprises:

determining, in the warehouse coordinate system, first referential three-dimensional coordinates of a vertex in the mark code according to the first motion position and pose, the information on the first image and a focal length of the image collection sensor;

determining, in the warehouse coordinate system, second referential three-dimensional coordinates of the vertex in the mark code according to the second motion position and pose, the information on the second image and the focal length of the image collection sensor;

calculating three-dimensional coordinates of the vertex in the mark code in the warehouse coordinate system based on the first referential three-dimensional coordinates and the second referential three-dimensional coordinates by using triangulation; and calculating, according to target three-dimensional coordinates of the vertex in the mark code in the warehouse coordinate system, horizontal coordinates of the mark code in the warehouse coordinate system, and determining the horizontal coordinates as the mark position.

5. The method according to claim 2, wherein the mark comprises a mark code, and the information of the mark comprises information on an image of the mark code, and the determining a mark position of the mark in the warehouse map based on the motion position and pose and the information of the mark comprises:

calculating referential three-dimensional coordinates of a vertex in the mark code in a coordinate system of the image collection sensor by using depth information of the image collection sensor and the information on the image;

converting the referential three-dimensional coordinates of the vertex into target three-dimensional coordinates in the warehouse coordinate system according to the motion position and pose; and calculating horizontal coordinates of the mark code in the warehouse coordinate system according to the target three-dimensional coordinates, and determining the horizontal coordinates as the mark position.

6. The method according to claim 2, wherein the determining the depositary place position of each depositary place on the rack in the warehouse map according to the preset depositary place information of the rack and the mark position comprises:

determining a position area, corresponding to the same group of marks, of the rack according to mark positions of the same group of marks;

dividing the position area according to the number of single-layer depositary places in the preset depositary place information, so as to acquire horizontal coordinates of depositary places of each layer; and determining the horizontal coordinates of the depositary place as the depositary place position.

7. The method according to claim 1, further comprising:
creating a corresponding relation between a preset depositary place mark of each depositary place on the rack and a corresponding depositary place position of the depositary place.

8. The method according to claim 1, further comprising:
collecting a positioned position of the robot moving in the warehouse by using a robot positioning system when the robot picks goods according to the warehousing map;

acquiring information of a mark on a rack collected by the robot at the positioned position, and calculating a calculated position of the robot according to a mark position corresponding to the information of the mark;

calculating a positional deviation between the calculated position and the positioned position; and calibrating the positioned position by using the positional deviation.

9. A non-transitory computer readable storage medium storing one or more programs, wherein the one or more programs are able to be executed by one or more processors, so as to implement the method according to claim 1.

10. An electronic device, comprising: a memory, a processor, and a computer program which is stored on the memory and is runnable on the processor, wherein when executing the program, the processor is configured to:

generate, according to induction data collected when a robot moves in a warehouse, a warehouse map of the warehouse;

acquire a motion position and pose of the robot in real time, and acquire information of a mark on a rack collected by an image collection sensor on the robot, wherein at least one rack is arranged in the warehouse, each rack is provided with at least one group of marks, and an outer outline surface of the rack is provided with at least one mark;

determine a mark position of the mark in the warehouse map based on the motion position and pose and the information of the mark;

determine a rack position of the rack and a depositary place position of each depositary place on the rack in the warehouse map according to preset depositary place information of the rack and the mark position; and determine a warehousing map of the warehouse according to the warehouse map, the rack position and the depositary place position.

11. The electronic device according to claim 10, wherein the processor is further configured to:

create a corresponding relation between a preset depositary place mark of each depositary place on the rack and a corresponding depositary place position of the depositary place.

12. A robot, comprising:
an inductive sensor configured to collect induction data in a warehouse;

an image collection sensor configured to collect information of a mark on a rack of the warehouse;

a position and pose sensor configured to collect a motion position and pose of the robot; and a processor configured to determine a mark position of the mark in a warehouse map based on the motion position and pose and the information of the mark; determine a depositary place position of each depositary place on the rack in the warehouse map according to preset depositary place information of the rack and the mark position; and create a corresponding relation between a preset depositary place mark of each depositary place on the rack and a corresponding depositary place position of the depositary place.

13. The robot according to claim 12, wherein the processor is further configured to:

determine an origin in the warehouse; and create a warehouse coordinate system of the warehouse based on the origin, wherein the warehouse map, the motion position and pose, the mark position, the rack position and the depositary place position are all in the warehouse coordinate system.

14. The robot according to claim 13, wherein the processor is further configured to generate, according to the induction data collected when the robot moves in the warehouse, the warehouse map of the warehouse.

15. The robot according to claim 14, wherein the processor is configured to:

acquire data of an outline of each object in the warehouse scanned by a radar on the robot;

draw data of a shape of the object in the warehouse according to the data of the outline; and create the warehouse map of the warehouse in the warehouse coordinate system according to the data of the shape.

16. The robot according to claim 13, wherein the mark comprises a mark code, the information of the mark comprises information on an image of the mark code, the motion position and pose comprises a first motion position and pose and a second motion position and pose, the information of the mark comprises information on a first image, collected in the first motion position and pose, of the mark code, and information on a second image, collected in the second motion position and pose, of the mark code; and the processor is configured to:

determine, in the warehouse coordinate system, first referential three-dimensional coordinates of a vertex in the mark code according to the first motion position and pose, the information on the first image and a focal length of the image collection sensor;

determine, in the warehouse coordinate system, second referential three-dimensional coordinates of the vertex in the mark code according to the second motion position and pose, the information on the second image and the focal length of the image collection sensor;

calculate three-dimensional coordinates of the vertex in the mark code in the warehouse coordinate system based on the first referential three-dimensional coordinates and the second referential three-dimensional coordinates by using triangulation; and calculate, according to target three-dimensional coordinates of the vertex in the mark code in the warehouse coordinate system, horizontal coordinates of the mark code in the warehouse coordinate system, and determining the horizontal coordinates as the mark position.

17. The robot according to claim 13, wherein the mark comprises a mark code, and the information of the mark comprises information on an image of the mark code, and the processor is configured to:

calculate referential three-dimensional coordinates of a vertex in the mark code in a coordinate system of the image collection sensor by using depth information of the image collection sensor and the information on the image;

convert the referential three-dimensional coordinates of the vertex into target three-dimensional coordinates in the warehouse coordinate system according to the motion position and pose; and calculate horizontal coordinates of the mark code in the warehouse coordinate system according to the target three-dimensional coordinates, and determining the horizontal coordinates as the mark position.

18. The robot according to claim 13, wherein the processor is configured to:

determine a position area, corresponding to the same group of marks, of the rack according to mark positions of the same group of marks;

divide the position area according to the number of single-layer depositary places in the preset depositary place information, so as to acquire horizontal coordinates of depositary places of each layer; and determine the horizontal coordinates of the depositary place as the depositary place position.

19. The robot according to claim 12, wherein the processor is further configured to:

create a corresponding relation between a preset depositary place mark of each depositary place on the rack and a corresponding depositary place position of the depositary place.

20. The robot according to claim 12, wherein the processor is further configured to:

collect a positioned position of the robot moving in the warehouse by using a robot positioning system when the robot picks goods according to the warehousing map;

acquire information of a mark on a rack collected by the robot at the positioned position, and calculating a calculated position of the robot according to a mark position corresponding to the information of the mark;

calculate a positional deviation between the calculated position and the positioned position; and calibrate the positioned position by using the positional deviation.

* * * * *